Patented Dec. 30, 1930

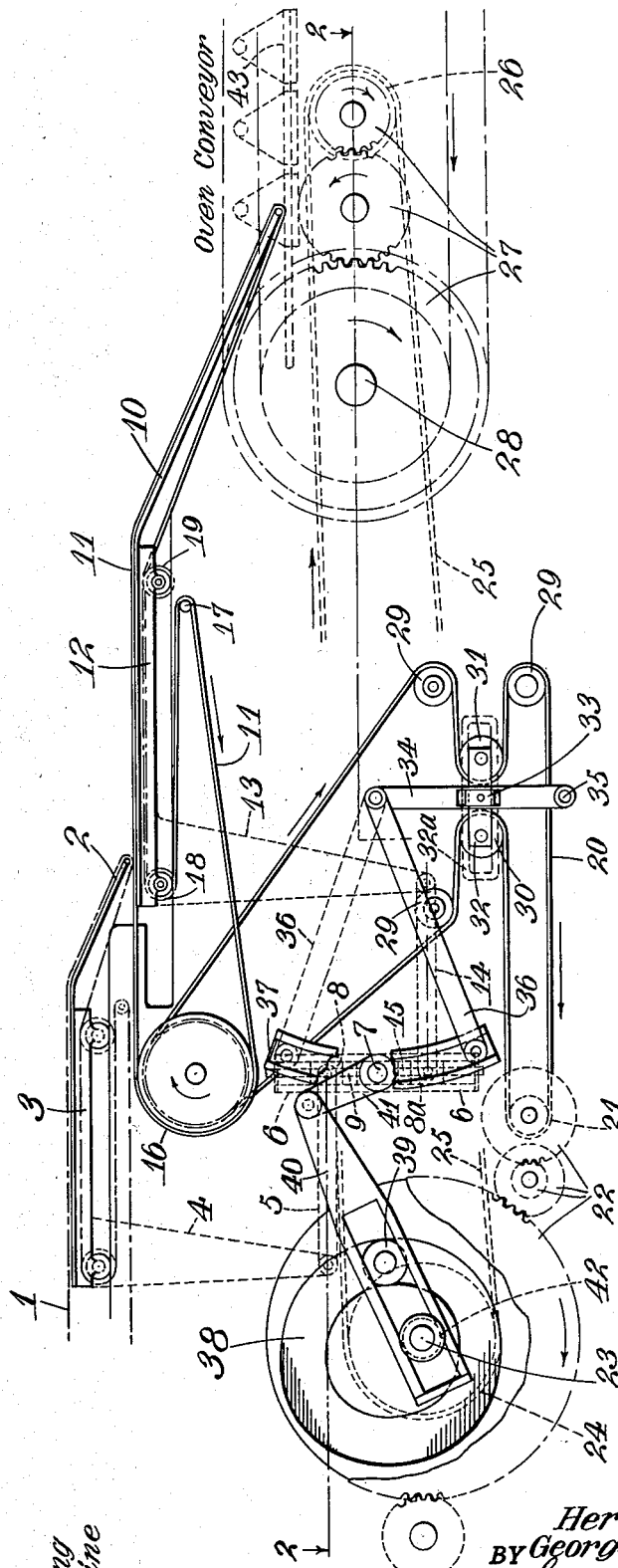

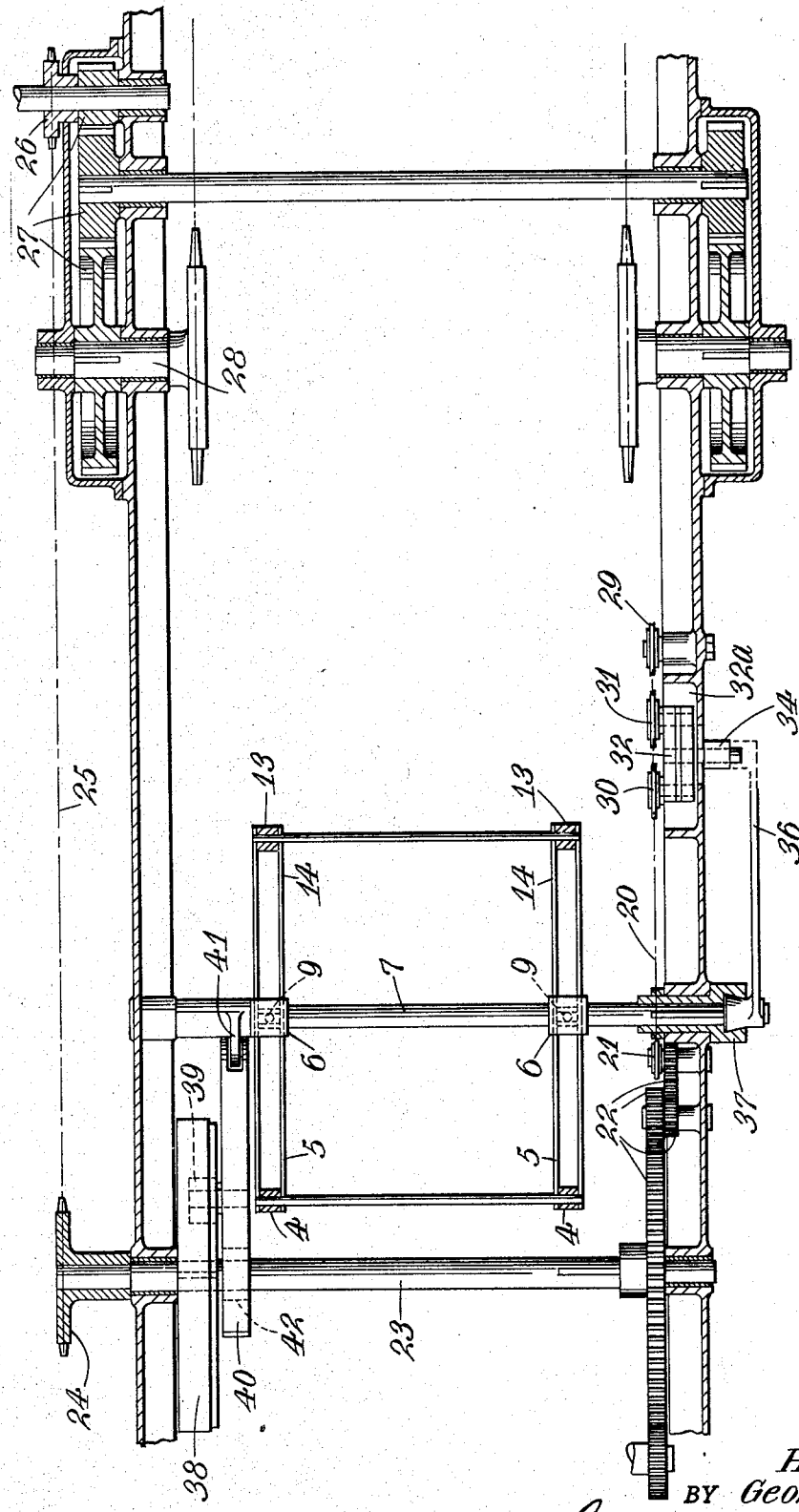

1,787,254

UNITED STATES PATENT OFFICE

HERBERT KIRMAN AND GEORGE RALPH BAKER, OF WILLESDEN, ENGLAND, ASSIGNORS TO BAKER PERKINS COMPANY, INC., OF SAGINAW, MICHIGAN, A CORPORATION OF NEW YORK

CONVEYING OR DELIVERING BISCUITS OR LIKE ARTICLES

Application filed January 28, 1930, Serial No. 424,121, and in Great Britain January 30, 1929.

This invention relates to methods of and means for conveying or delivering biscuits to spaced pans on a moving conveyor, in batches. Although the invention is capable of application to other articles it will be convenient to describe it with reference to the delivery of biscuits from a machine that cuts biscuit shapes from a continuous sheet of dough and discharges the biscuits in equally spaced consecutive rows.

The problem with which the invention is more particularly concerned is to deliver biscuits from a cutting machine to spaced baking pans that are in motion and to make such delivery so that the consecutive rows of biscuit shapes are delivered to the pans on an oven conveyor in batches that are spaced from each other at intervals corresponding to the spacing of the pans, the several biscuit rows of each batch being arranged relatively to one another at such intervals as may be demanded by baking conditions.

Within this main problem other problems are concerned. For example, the speed of the travel of the pans through the oven must of course be varied according to the nature of the biscuits to be baked. Therefore, synchronism must be effected between the delivery of the biscuits to the pans and the travel of the pans in order to secure the proper disposition of the biscuits upon the pans.

The present invention introduces a new principle directed to the solution of the problems involved. An object of the invention is to provide an improved method and means for controlling and adjusting the spacing of the delivered rows and batches in a simplified manner and by the use of relatively inexpensive machinery.

Another object is to provide a biscuit transfer apparatus that affords a great range or flexibility with respect to the spacing of the biscuit rows and the positioning and arrangement of the batches on the pans.

According to the invention as applied to the feeding of biscuits or the like from a continuously operating cutting machine to a continuously moving oven conveyor, the rows of biscuits are formed into groups or batches after they leave the cutting machine and before they are discharged onto the oven conveyor.

The invention also comprises means for acceleration or retardation of the biscuits after they are delivered row by row from the cutting machine in order to suitably alter the intervals between the rows as established by the cutting machine. Furthermore, the invention also provides means for supplementary alteration of the spacing interval between the consecutive rows of biscuits in each batch. This is done by again accelerating or retarding them row by row as the batch is received upon the oven pan. It is, therefore, possible to open out, close up, or copy the spacing interval between the individual rows of biscuits as determined by the cutting machine. Thus any desired arrangement of biscuits upon the oven conveyor may be secured.

A reciprocating cutting machine panner blade is employed as is customary in machines of the character having a biscuit-carrying band that transports biscuits away from the cutting machine to another endless traveling band, new with this invention, that operates around a second panner blade. The second band and blade are arranged to discharge biscuits onto the usual series of continuously moving oven pans. The last mentioned endless traveling band is arranged beneath the first mentioned cutting machine panner blade and above the path of travel of the oven pans.

With the foregoing and certain other objects in view, which will appear later in the specification, the invention comprises the devices described and claimed and the equivalents thereof.

In the accompanying drawings Fig. 1 is an elevation of the improved panning mechanism.

Fig. 2 is a corresponding plan partly in section on line 2—2 of Fig. 1, the aprons and panning blades having been removed.

In carrying the invention into effect suitable driving means are provided for the oven conveyor. The cutting machine (not shown) is operated synchronously with the oven conveyor, in known manner.

Coming from the cutting machine a biscuit band 1 travels over the cutting machine panner blade 2.

The blade 2 is given a continuous reciprocation. The length of its stroke is ordinarily half the length of a batch of biscuits, although in certain cases this ratio may be varied. Blade 2 is mounted upon a wheeled carriage 3 having depending arms 4 connected by link 5 to rocking beams 6 mounted upon a rock shaft 7. The link 5 is connected to the beam 6 by sliding block 8 fitted with an adjusting screw 9 whereby the amplitude of the reciprocation of the carriage and of panner blade 2 may be varied. Between the cutting machine blade 2 and the path of the oven pans is mounted another panner blade 10 (hereinafter referred to as "the transfer panner blade").

Overlying the transfer panner blade 10 and co-operating with it in the usual way is a transfer band 11, the relative arrangement being such that the upper horizontal conveying portion of band 11 extends under the cutting machine blade 2, and its forward part slopes downwardly and overlaps the path of the oven conveyor as shown in Fig. 1.

Means are provided for reciprocation of the panner blade 10 after the same manner as those provided for the reciprocation of cutting machine blade 2, that is, the transfer panner blade 10 is mounted upon a wheeled carriage 12 having depending arms 13 that are connected by link 14 to a sliding block 8a operating in rocking beam 6 on rock shaft 7. Screw 15 provides means for adjusting the position of the point of connection of the links 14 on rocking beam 6.

The length of stroke of the transfer panner blade 10 may be the same as the length of stroke of the cutting machine blade 2. Preferably the blade 2 makes a rearward biscuit delivery stroke while the transfer panner blade 10 is making a forward stroke and holding back the delivery of biscuits, and vice versa. For that operation the pivotal connections of links 5 and 14 with the rocking beam 6 are arranged on opposite sides of rock shaft 7.

The transfer band 11 is supported on a driving roller 16, a guide roller 17 and on rollers 18 and 19 mounted on a reciprocating wheeled carriage 12. The extent of the top horizontal run of the transfer band is such as to accommodate two or more batches at a time.

Driving roller 16 is preferably actuated by a variable differential gear, that is capable not only of giving to the transfer band 11 a rate of travel uniform with that of the oven conveyor, but is also capable of giving the transfer band a so-called differential travel that consists of two alternating movements which may have a mean rate of travel equivalent to the rate of travel of the oven conveyor.

The drive for roller 16 is by means of a chain 20, sprocket 21, suitable spur gearing 22 and a shaft 23 and spocket 24, chain 25, sprocket 26, gearing 27 and oven conveyor shaft 28. Any increase of speed of the oven conveyor is thus copied by a corresponding variation in the travel of transfer band 11. By means of guide wheels 29 the chain 20 is provided with oppositely disposed bights passing around wheels 30, 31 on a horizontally reciprocating block 32, slidable in ways 32a.

Block 32 is connected by a pivoted guide block 33 to a slotted lever 34 pivoted at 35 to a fixed support. The upper end of lever 34 is connected by a link 36 to a rocking quadrant 37 keyed upon rock shaft 7. The pivotal connection of the link 36 to the quadrant 37 is such that it may be adjusted relatively to the axis of the rock shaft 7 and it may be located as desired on either side of such axis.

With link 36 adjusted to a position on quadrant 37 below the axis of the shaft 7, as shown in solid lines in Fig. 1, a clockwise rocking of the shaft (corresponding to backward movement of the transfer panner blade 10 and its carriage 12) moves the sliding block 32 to the left in Fig. 1, resulting in a speeding up of the transfer band 11. Rocking the shaft counter-clockwise results in slowing down the transfer band 11.

If link 36 be adjusted to its mid-position, coinciding with the axis of the rock shaft 7, block 32 will remain stationary and the movement of the roller 16 and of the transfer band 11 will be uniform and continuous.

It is now apparent that rock shaft 7, during its oscillation, moves carriage 3 and its panner blade 2 back and forth and it also moves carriage 12 and its transfer panner blade 10 similarly, but in opposite sense. It is also apparent that rock shaft 7 imparts to roller 16 and transfer band 11 the non-uniform travel of differential movement above alluded to, provided the pivotal connection of link 36 and quadrant 37 is away from axial alinement with rock shaft 7.

Oscillatory motion is imparted to the rock shaft 7 by a cam 38 on power-driven shaft 23. Cam 38 engages a roller 39 on an arm 40 connected to a crank arm 41 which is keyed to the rock shaft 7. The free end of arm 40 is forked and rides over a roller 42 on shaft 23.

The mode of operation and the co-operative functions of the instrumentalities above described will now be discussed.

The machine embodying the subject matter of this invention is operatively interposed between the oven conveyor and the cutting machine, which are assumed to be synchronously driven in known manner, not illustrated herein, because the specific connections between the two are immaterial to the claimed invention. The oven conveyor is moved continuously and uniformly at any selected rate of travel according to existing baking, handling or other requirements.

Any point on the transfer band 11 advances a distance approximately equal to the pitch of the oven pans 43 in the same time that the oven pans advance a distance equal to their pitch. Although the transfer band travels through the pitch distance of a pan in the same time as the oven conveyor moves through the same distance, yet the actual speed of the transfer band need not be uniform, that is to say, the band preferably has a differential rate of travel characterized by two alternating speeds (e. g. a slow movement and a faster movement), in step with the respective backward or delivery strokes of the two blades 2 and 10.

Suppose the connection of link 36 to quadrant 37 is positioned below the rock shaft 7. Each passage of the transfer band 11 through the pitch distance of a batch will thus consist of a slower movement and a faster movement, the slower movement coinciding with the backward or delivery movement of the cutting machine blade 2, its speed approximating to the rate of delivery of the biscuits from the cutting machine blade 2. That rate may be the same as the rate of travel of the cutting machine band 1.

If the slower differential movement of band 11 is speeded up relatively to the speed of band 1 by setting the pivot of link 36 on quadrant 37 closer to shaft 7, the spacing between rows will be widened as compared with the cutting machine spacing of biscuits on band 1; or again, the slower movement may be relatively less than the rate of travel of the biscuit band 1, in which case the intervals between rows as delivered to pans 43 will be smaller than the spaces between rows on band 1.

The fast movement of band 11 over the pitch distance, takes place while the cutting machine blade 2 is moving forwardly to regain its delivery position and is preventing the transfer of biscuits from band 1 to band 11.

During the quicker movement of band 11 a greater length of transfer band 11 passes beneath delivery blade 2 than during the slower movement. In other words, the slower movement may traverse somewhat less than half the pitch distance under cutting machine blade 2 while it is delivering, and somewhat more than half the pitch distance while blade 2 is moving forward. Thus is attained a spacing interval between batches according to the pan spacing arrangement.

As to the spacing between individual rows of biscuits, any considerable adjustment of this spacing is effected by adjusting the speed of the cutting machine conveyor 1 relatively to that of the oven conveyor. For example, if it were desired to have the biscuits spaced on the pans at average intervals twice those prevailing as they came from the cutting machine, the cutting machine and its conveyor would be adjusted to operate at one half the speed of the oven pan conveyor, hence one half the average speed of transfer band 11. In addition to this adjustment, however, as explained earlier in this specification, the spacing intervals between the rows of a batch of biscuits delivered upon an oven pan 43 can be varied by adjustment of the relative speeds that are imparted to the transfer band 11 during its differential periods of travel. That is, the rows of any one batch can be closed up or spread out, increasing or taking from the free space between that batch and the following.

Turning now to the consideration of the transfer panner blade 10 it reciprocates in opposite sense to the cutting machine blade 2, and in consequence will be delivering batches (produced by the cutting machine blade 2) while the latter is regaining its delivery position and is producing the spacing interval. As has been seen the band 11 travels at the slower of its two speeds while the cutting machine blade 2 is moving back and delivering, this slower movement coinciding with the return or forward stroke of the transfer panner blade 10 and, correspondingly, the quicker part of the movement takes place on the delivery stroke or the transfer panner blade 10.

Because the mean rate of travel of the transfer band 11 approximates to the rate of travel of the pans, the quicker of the two speeds of band 11 referred to above will be relatively somewhat greater than the rate of travel of the pans during the delivery stroke of the transfer panner blade 10. Hence, the backward movement of blade 10 compensates for the speed of band 11 in excess of the speed of the oven conveyor. The biscuits alight on the pan spaced at the same intervals as on the band 11.

Having thus described our invention, what we claim and desire to secure by Letters Patent is:

1. In combination an oven having a continuously traveling conveyor carrying pans, a band conveyor supplying rows of biscuits from a cutting machine, a transfer band conveyor, means imparting movement thereto at alternating faster and slower speeds, said transfer band conveyor positioned to receive biscuits from said supply conveyor in rows grouped into batches, a reciprocating panner blade cooperating with said intermittently moving transfer band, said panner blade positioned to deliver said batches onto the pans of said oven conveyor, and means for imparting reciprocatory motion to said panner blade in synchronism with said alternating faster and slower movements of the transfer band conveyor.

2. In combination, an oven having a continuously traveling conveyor carrying baking pans, a band conveyor traveling continuously at a uniform speed supplying biscuits from a cutting machine, a reciprocating panner blade co-operating therewith, a transfer band conveyor, means imparting travel thereto at alternately faster and slower speeds, said transfer band conveyor positioned to receive biscuits from said supply conveyor in rows grouped into batches, a reciprocating panner blade co-operating with said intermittently moving transfer band, said band and panner blade arranged to deliver said batches to the pans on the open conveyor, and means for imparting reciprocatory motion to both of said panner blades in synchronism with said alternating faster and slower movements of the transfer band conveyor and in synchronism with each other but in opposite sense.

3. A structure as set forth in claim 2 wherein the average speed of said transfer band conveyor is maintained at approximately that of said oven pan conveyor.

In testimony whereof, we affix our signatures.

HERBERT KIRMAN.
GEORGE RALPH BAKER.